June 2, 1936.  F. L. SHELOR  2,042,809
FLUID PRESSURE CONTROLLED BRAKING MECHANISM
Original Filed Jan. 18, 1933
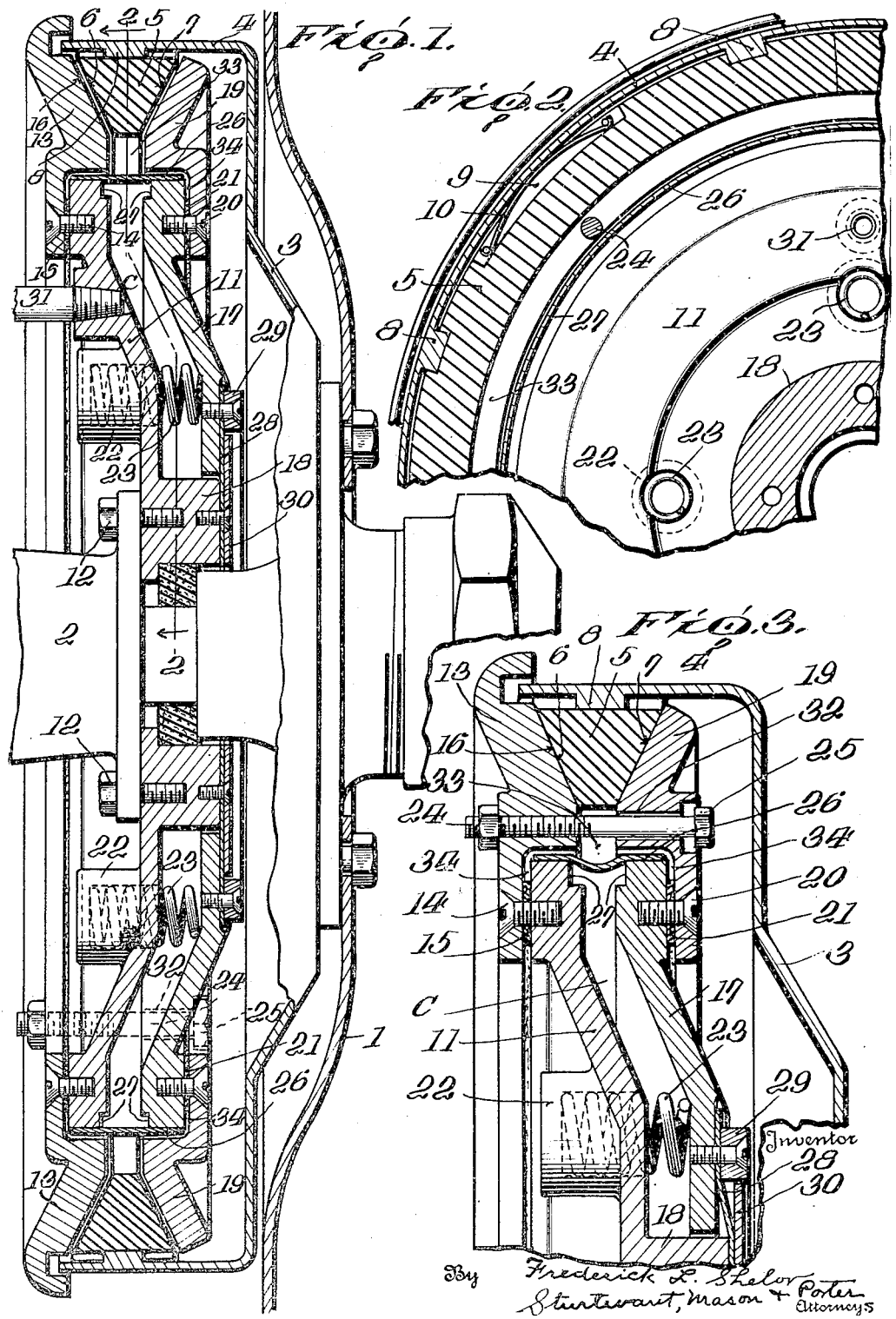
Inventor
Frederick L. Shelor
By Sturtevant, Mason & Porter
Attorneys Patented June 2, 1936

2,042,809

UNITED STATES PATENT OFFICE 2,042,809

FLUID PRESSURE CONTROLLED BRAKING MECHANISM

Frederick L. Shelor, Richmond, Va., assignor to Innovation Brakes, Inc., Richmond, Va., a corporation of Virginia Application January 18, 1933, Serial No. 652,389
Renewed August 22, 1935

10 Claims. (Cl. 188—72)

The invention relates to new and useful improvements in a braking mechanism for rotating parts and more particularly to a fluid pressure controlled mechanism. In my co-pending application, Ser. No. 572,705, filed November 2, 1931, now Patent No. 1,948,190 issued February 20, 1934, there is shown and described a braking mechanism wherein the rotatable member provided with a braking surface and the brake shoes carried therewith, are carried by spaced disks which are non-rotating but movable relative to each other in a direction axially of the wheel for bringing the brake shoes into contact with the braking surface. These disks are connected at their outer end by a flexible member and are likewise so connected at their inner end that a vacuum chamber is created between the disks. When said chamber is placed under vacuum, the brake shoes are moved into contact with the braking surface on the rotatable member, and when the vacuum is released, spring means separate said disks. Heat generated when the brake shoes are in contact with the braking surface on the rotatable member is transmitted to the flexible member connecting the disks and has more or less of a serious deteriorating effect thereon.

An object of the present invention is to provide a braking mechanism of the above type wherein the brake shoes are rigidly attached to the disks but spaced therefrom so as to provide a heat insulating space that prevents destructive heat transfer from the brake shoes through the disks to the flexible member connecting the same.

A further object of the invention is to provide an arrangement of disks forming the vacuum chamber so that the vacuum chamber is of relatively small capacity, while the movable surface shiftable by atmospheric pressure, is of maximum area for location in a given diameter of brake drum.

These and other objects will in part be obvious and will in part be hereinafter more fully described.

In the drawing which shows by way of illustration one embodiment of the invention:

Fig. 1 is a view partly in vertical section through a rotatable member having the improved braking mechanism applied thereto.

Fig. 2 is a sectional view on the line 2—2 of Fig. 1.

Fig. 3 is a detail similar to Fig. 1, but showing the chamber under vacuum and the brake shoes in contact with the braking surface on the brake drum.

The invention as illustrated is applied to the braking of a wheel of an automobile, but it will be understood that it may be used in connection with any rotating member. Attached to the rotating member is a drum carrying a braking surface. Located within the drum are two disks, one of which is rigidly fixed to the axle housing for the wheel and is a non-rotatable member. The other is keyed to the axle housing or is attached to the first named disk so that it is likewise non-rotatable, but is capable of movement toward and from the stationary disk.

Connecting the disks at the outer ends thereof is a flexible member which seals the space between the disks at said outer ends. Connecting the inner end of the movable disk with the stationary disk is a flexible member which likewise seals the connection between the disks at the inner end of the space between the disks. This forms a chamber between the disks which may be placed under vacuum for causing the movable disk to shift toward the fixed disk. A series of springs operate to separate the disks when the chamber is released from vacuum and bolts limit the separating movement of the disks.

This chamber between the disks is substantially the same width throughout, that is, the walls are similarly shaped and are parallel. The chamber extends from a point adjacent the hub of the wheel to a point adjacent the braking member on the drum and this gives a maximum surface subjected to air pressure for shifting the disks relative to each other for a given size of drum. The disks may be placed very close to each other, as they are similar in shape and thus a chamber of minimum capacity provided so that in drawing a vacuum thereon, comparatively little air has to be removed from the chamber. The flexible member connecting the outer ends of the disks is exposed to atmospheric pressure on the outer face thereof and when the chamber is placed under vacuum, it will buckle and the buckling of the flexible member will draw the movable disk toward the fixed disk. This greatly increases the area available for shifting the movable disk. The brake shoes are attached to these disks and cooperate with a braking member carried by the drum. These brake shoes are rigidly attached to the disks by screws or bolts and between the shoes and disks is a heat insulating space which may be filled in part with a heat insulating material so as to form a rigid connection and at the same time prevent heat transfer from the brake shoes to the disks and from the disks to the flexible member connecting the outer ends thereof.

Referring more in detail to the drawing, the invention is shown as applied to a rotating wheel 1, mounted for rotation on an axle housing indicated at 2. These parts are of the usual construction and form no part of the present invention. Mounted on the wheel 1 is a brake drum 3, having an overhanging flange 4 of the usual construction. Attached to the inner face of the drum is a braking member 5 formed of segments, which function as an annular braking member having as shown braking faces 6 and 7 which incline toward each other radially in an inward direction. This braking member may be made of any construction for producing a wear resisting braking surface. The braking member 5 is provided with recesses adapted to receive lugs 8 carried by the drum. These recesses extend transversely across the braking member 5 and serve as a means for preventing the braking member from rotating about the axis of the drum, while permitting said braking member to shift laterally of the plane of the drum. The recesses extend all the way to the inner side face of the braking member so that the segments may be assembled and inserted within the drum. The braking member 5 is also provided with recesses 9, in each of which is located a flat spring 10 which presses inwardly on the segments, insuring that the ends of the segments remain in contact and thus prevent rattling or pounding of the sections on the drum when the brake shoes are released.

Mounted on the axle housing is a disk 11, said disk being secured to the axle housing by bolts 12, 12. This disk extends all the way from the axle housing to a point adjacent the braking member 5, but is slightly spaced therefrom. Attached to the disk 11 is a brake shoe 13. This brake shoe is secured to the disk by bolts 14. Between the disk and the shoe is a spacing member so that there is a heat insulating space between the shoe and the disk. Preferably a heat insulating material such as asbestos is placed between the disk and the shoe to effect this spacing of the shoe from the disk and at the same time permit the shoe to be rigidly attached to the disk. This heat insulating material is indicated at 15 in the drawing. The brake shoe 13 is provided with an inclined braking face 16 which is parallel with the face 6 on the braking member 5. This disk 11 is fixed to the axle so that it neither rotates nor does it have any movement laterally of the wheel. The braking member 5 is moved laterally on the drum into contact with the brake shoe.

Cooperating with this fixed disk 11 is a disk 17. The disk 17 has its inner face shaped to conform to the inner face of the disk 11. This inner disk 17 has an opening centrally thereof which freely engages over a hub 18 on the fixed disk 11. The disk 17 extends outwardly to the same distance as the disk 11. A brake shoe 19 is secured to the disk 17 by bolts 20. Between the shoe and the disk 17 is a heat insulating space which is filled in part by a heat insulating material such as asbestos which is indicated at 21. This provides a rigid connection between the brake shoe 19 and the disk 11, which at the same time prevents heat from being transferred from the brake shoe to the disk, the advantage of which will be described later.

The disk 11 is provided with a boss 22, which is provided with a recess serving as a seat for a coil spring 23. There are a series of these springs and each spring bears against the inner face of the disk 17. Fixed to the brake shoe 13 is a series of bolts 24, which bolts pass through the brake shoe 19, thus connecting the two brake shoes but permitting the brake shoe 19 to move freely endwise of the bolts limited in its movement by the heads of the bolts which are indicated at 25. This movable disk 17 may be keyed to the axle housing or keyed to the hub 18 of the disk 11, so that it is non-rotatable the same as the disk 11, but it has a free lateral movement relative to the disk 11. The springs operate to separate the disks and the bolts limit the movement of the disks under the action of the springs.

Connecting the outer ends of the disks 11 and 17, is a flexible diaphragm of any suitable impervious material, preferably treated fabric. This flexible member is indicated at 26, said member being secured to the peripheral edges of the disks 11 and 17 so as to have a tight sealing engagement therewith, thus closing the chamber between the disks at the peripheral edges of the disk. It is noted that the inner portions of the disks adjacent this flexible member are recessed as indicated at 27, 27 for the purpose of increasing the area of the flexible member between the disks so that it is slightly greater than the distance between the walls of the chamber between the disks. The chamber just referred to is indicated at C in the drawing.

There is a similar flexible member 28 connecting the inner portion of the disk 17 and the hub 18 so as to provide a tight seal between the disk and the hub and at the same time permit the disk 17 to move relative to the hub. This flexible member is clamped against the disk 17 by a ring 29, which is bolted to the disk 17. There is a plate 30 shown which is attached to the hub 18 and clamps the disk tightly against the hub. This plate overlies the inner portion of the movable disk 17 and serves as a limiting stop for the outward movement of the disk 17. These flexible members connecting the disks close the chamber C so that it may be put under vacuum, thus creating a differential pressure on opposite sides of the movable disk 17. This will move the disk 17 toward the fixed disk 11 carrying the brake shoe 19 into contact with the braking member 5 and shifting the braking member 5 into contact with the brake shoe 13. This will cause the braking member to be firmly gripped between the two brake shoes and thus apply the braking pressure to retard or stop the movement of the drum and wheel to which it is attached. A pipe 31 is connected with this chamber C and leads to a suitable vacuum creating means through a control valve mechanism so that the vacuum created on said chamber may be of any desired degree and thus a variable brake pressure applied.

It will be noted that the opening in the brake shoe 19, through which the bolts 24 pass, is larger than the bolt, thus creating an air space 32 leading to the space 33 and to spaces 34, 34 between the flexible member connecting the disks and the adjacent parts of the brake shoes. These spaces 34, 34 together with the spaces between the side faces of the disks and the brake shoes establish a heat insulating space so that the heat incident to applying the brakes which heats the brake shoes, is not transmitted to the disks 11 and 17 and therefore is not transmitted to the flexible member 26.

In the operation of the braking mechanism the chamber C is placed under vacuum and this creates not only a differential pressure on the opposite faces of the disk 17, but also on the opposite faces of the flexible member 26. The atmospheric pressure bearing against the flexible member will buckle the same as shown in Fig. 3, and this buckling of the flexible member will draw the movable disk toward the fixed disk and assist in forcing the brake shoe 19 into firm gripping contact with the braking member 5. The pressure tending to shift the movable disk 17 when the chamber is under vacuum is the atmospheric pressure against the outer face of the disk to which is added the atmospheric pressure against the flexible member. The inner face of the disk 17 is throughout a greater portion of its extent similar to the inner face of the disk 11. The two faces are parallel and therefore may be moved very close together and the chamber C thus may be made of minimum capacity. This greatly aids in the quick response of the brakes as very little air has to be drawn from the chamber to establish a desired degree of vacuum therein. Furthermore, inasmuch as the movable disk extends from a point adjacent the axis of the wheel or the center of the drum to a point adjacent the braking member on the drum, a maximum area is provided in a given sized drum upon which a differential air pressure is obtained for operating the braking members.

It is obvious that minor changes in the details of construction and arrangement of parts may be made without departing from the spirit of the invention as set forth in the appended claims.

Having thus fully described the invention, what I claim as new and desire to secure by Letters Patent is:

1. In a braking mechanism the combination of a rotatable member, a braking member secured to said rotatable member for rotation therewith, non-rotating disks disposed in planes parallel with the rotatable member having a movement relative to each other, a brake shoe rigidly attached to each disk and adapted to engage the braking member, flexible members connecting said disks, one of said members being located at the peripheral edges of said disks and the other radially inward therefrom and forming a chamber therebetween adapted to be placed under vacuum for causing an engagement between the brake shoes and the braking member, and means located between each brake shoe and its supporting disk for preventing destructive heat transfer from the brake shoes through the disks to the flexible members.

2. In a braking mechanism the combination of a rotatable member, a braking member secured to said rotatable member for rotation therewith, non-rotating disks disposed in planes parallel with the rotatable member having a movement relative to each other, flexible members connecting said disks, one of said members being located at the peripheral edges of said disks and the other radially inward therefrom and forming a chamber therebetween adapted to be placed under vacuum for causing a movement of the disks toward each other, springs for separating the disks, stops for limiting the separating movements of the disks, a brake shoe associated with each disk, means for rigidly attaching the brake shoe to the disk with which it is associated, said attaching means including means for preventing destructive heat transfer from the brake shoe through the disks to the flexible members.

3. In a braking mechanism the combination of a rotatable member, a braking member secured to said rotatable member for rotation therewith, non-rotating disks disposed in planes parallel with the rotatable member having a movement relative to each other, flexible members connecting said disks, one of said members being located at the peripheral edges of said disks and the other radially inward therefrom and forming a chamber therebetween adapted to be placed under vacuum for causing a movement of the disks toward each other, springs for separating the disks, stops for limiting the separating movements of the disks, a brake shoe associated with each disk, means for rigidly connecting each shoe to its associated disk so as to provide a space between the shoe and the disk for preventing destructive heat transfer from the brake shoe through the disks to the flexible members.

4. In a braking mechanism the combination of a rotatable member, a braking member secured to the rotatable member for rotation therewith, non-rotating disks disposed in planes parallel with the rotatable member having a movement relative to each other, flexible members connecting said disks, one of said members being located at the peripheral edges of said disks and the other radially inward therefrom and forming a chamber therebetween adapted to be placed under vacuum, a brake shoe rigidly carried by each disk and adapted to engage the braking member, means located between each brake shoe and its supporting disk for preventing destructive heat transfer from the brake shoe through the disks to the flexible members, the adjacent faces of said disks being similarly shaped and equally spaced throughout substantially their entire extent whereby said disks may be placed close together and the space within the chamber placed under vacuum reduced to a minimum.

5. In a braking mechanism the combination of a rotatable member, a braking member secured to the rotatable member for rotation therewith, non-rotating disks having a movement relative to each other, flexible members connecting said disks and forming a chamber therebetween adapted to be placed under vacuum, a brake shoe rigidly carried by each disk and adapted to engage the braking member, the adjacent faces of said disks being similarly shaped and equally spaced throughout substantially their entire extent, whereby said disks may be placed close together and the space within the chamber placed under vacuum reduced to a minimum, one of said disks having outwardly projecting bosses provided with recesses opening into the chamber, springs within the recesses operating to separate said disks and means for limiting the separation of the disks.

6. In a braking mechanism the combination of a rotatable member, a braking member secured to the rotatable member for rotation therewith, non-rotating disks having a movement relative to each other, flexible members connecting said disks and forming a chamber therebetween adapted to be placed under vacuum, a brake shoe rigidly carried by each disk and adapted to engage the braking member, the adjacent faces of said disks being similarly shaped and equally spaced throughout substantially their entire extent, whereby said disks may be placed close together and the space within the chamber placed under vacuum reduced to a minimum, one of said disks having outwardly projecting bosses provided with recesses opening into the chamber, springs within the recesses operating to separate said disks, headed bolts passing through brake shoes and located outside of the outer flexible member connecting the disk for limiting the separating movement of the disks.

7. In a braking mechanism the combination of a rotatable member, a brake drum carried thereby, a braking member secured to said drum for rotation therewith, non-rotating disks having a movement relative to each other, a brake shoe rigidly attached to each disk adapted to engage the braking member, flexible members connecting the disks and forming therebetween a chamber adapted to be placed under vacuum, one of said flexible members connecting the peripheral edges of the disk and spanning the space therebetween and subjected to atmospheric pressure whereby when said chamber is placed under vacuum, said flexible member will buckle and assist in forcing the disks toward each other and the brake shoes into contact with the braking member.

8. In a braking mechanism the combination of a rotatable member, a brake drum carried thereby, a braking member secured to said drum for rotation therewith, non-rotating disks having a movement relative to each other, a brake shoe rigidly attached to each disk adapted to engage the braking member, flexible members connecting the disks and forming therebetween a chamber adapted to be placed under vacuum, one of said flexible members connecting the peripheral edges of the disk and spanning the space therebetween and subjected to atmospheric pressure whereby when said chamber is placed under vacuum, said flexible member will buckle and assist in forcing the disks toward each other and the brake shoes into contact with the braking member, the inner faces of said disks being similarly shaped and equally spaced substantially throughout their entire extent whereby said disks may be placed close together and reduce to a minimum the space which is to be placed under vacuum.

9. In a braking mechanism the combination of a rotatable member, a brake drum carried thereby, a braking member secured to said drum for rotation therewith, non-rotating disks having a movement relative to each other, a brake shoe rigidly attached to each disk adapted to engage the braking member, flexible members connecting the disks and forming therebetween a chamber adapted to be placed under vacuum, one of said flexible members connecting the peripheral edges of the disks and spanning the space therebetween and subjected to atmospheric pressure whereby when said chamber is placed under vacuum, said flexible member will buckle and assist in forcing the disks toward each other and the brake shoes into contact with the braking member, the inner faces of said disks being similarly shaped and equally spaced substantially throughout their entire extent whereby said disks may be placed close together and reduce to a minimum the space which is to be placed under vacuum, one of said disks having outwardly projecting bosses having recesses opening into the chamber, springs in said recess operating to separate the disks and a stop for limiting the movement of the disks away from each other.

10. In a braking mechanism the combination of a rotatable member, a brake drum carried thereby, a braking member secured to said drum for rotation therewith, non-rotating disks having a movement relative to each other, a brake shoe rigidly attached to each disk adapted to engage the braking member, flexible members connecting the disks and forming therebetween a chamber adapted to be placed under vacuum, one of said flexible members connecting the peripheral edges of the disk and spanning the space therebetween and subjected to atmospheric pressure whereby when said chamber is placed under vacuum, said flexible member will buckle and assist in forcing the disks toward each other and the brake shoes into contact with the braking member, the inner faces of said disks being similarly shaped and equally spaced substantially throughout their entire extent whereby said disks may be placed close together and reduce to a minimum the space which is to be placed under vacuum, one of said disks having outwardly projecting bosses having recesses opening into the chamber, springs in said recesses operating to separate the disks, bolts carried by one of said brake shoes and projecting through the other having a head overlying the brake shoe for limiting the movement of the disks away from each other.

FREDERICK L. SHELOR.